US00RE41036E

(19) United States
(12) Reissued Patent
Bushey et al.

(10) Patent Number: US RE41,036 E
(45) Date of Reissued Patent: Dec. 15, 2009

(54) LINEAR ACTUATOR CONTROL STRUCTURE

(75) Inventors: Bruce Bushey, Minneapolis, MN (US); Terry Schwartz, Shoreview, MN (US); Richard Milun, Corcoran, MN (US); Robert Erko, Apple Valley, MN (US); John Haeg, Minneapolis, MN (US)

(73) Assignee: Tennant Company, Minneapolis, MN (US)

(21) Appl. No.: 10/693,525

(22) Filed: Oct. 23, 2003

Related U.S. Patent Documents

Reissue of:
(64) Patent No.: 6,614,195
Issued: Sep. 2, 2003
Appl. No.: 09/851,831
Filed: May 9, 2001

U.S. Applications:
(60) Provisional application No. 60/202,587, filed on May 9, 2000.

(51) Int. Cl.
*H02K 41/00* (2006.01)

(52) U.S. Cl. ..... 318/135; 318/254; 318/635
(58) Field of Classification Search ..... 318/135, 318/254, 138, 439, 5, 60, 581, 56, 621, 635, 318/560, 561, 565, 595, 632
See application file for complete search history.

(56) References Cited

U.S. PATENT DOCUMENTS 3,729,663 A 4/1973 Stevenson et al.
3,742,327 A 6/1973 Nettles
4,074,179 A 2/1978 Kuo
4,307,799 A 12/1981 Zouzoulas
4,351,078 A * 9/1982 Sternberg ..... 15/52.1

(Continued)

OTHER PUBLICATIONS

Brochure, "The PG8 Series of Wheelchair Controllers," Penny & Giles, 1 Airspeed Road, Christchurch, Dorset BH23 3TH UK (no date available).

Brochure, "The Pilot+ Family of Wheelchair Controllers," Penny & Giles 1, 1 Airspeed Road, Christchurch, Dorset BH23 3TH UK (no date available).

Drawing, "Pilot+ ALM–2 (Quickie)," Feb. 3, 1999.

Drawing, "Pilot+ Joystick Module—7 Key," Sep. 22, 1997.

Drawing, "Pilot+ Power Module With 1.0m Cable," Feb. 12, 1998.

Brochure, VSI Series of Integral Wheelchair Controllers.

Drawing, D 50149, dated Nov. 14, 2001.

PCT/US01/15663 Internal Preliminary Examination Report, dated Apr. 25, 2002.*

International Search Report PCT/US01/15663 Dated Sep. 14, 2001.*

*Primary Examiner*—Karen Masih
(74) *Attorney, Agent, or Firm*—Briggs and Morgan, P.A.

(57) ABSTRACT

A control system for a linear actuator having an electric motor drawing a variable current level during operation. The control system includes a current level sensor for determining an operational current level of the linear actuator and a controller for generating a drive signal and a force request signal representative of a desired current level of the linear actuator. The drive signal remains constant during a predetermined time interval of the controller. The control system further includes a current limiting component for receiving the force request signal, the current level of the linear actuator and the drive signal. The current limiting component minimizes the current level of the electric motor in response to a comparison between the force request signal and the desired current level within a time interval substantially smaller than the predetermined time interval of the controller.

31 Claims, 5 Drawing Sheets

U.S. PATENT DOCUMENTS

| | | | | | |
|---|---|---|---|---|---|
| 4,382,308 | A | | 5/1983 | Curcio | |
| 4,415,941 | A | | 11/1983 | Gibeau et al. | |
| 4,467,250 | A | | 8/1984 | Thomasson | |
| 4,633,541 | A | | 1/1987 | Block | |
| 4,674,142 | A | | 6/1987 | Meili | |
| 4,757,566 | A | | 7/1988 | Field et al. | |
| 4,763,219 | A | | 8/1988 | Nakamura | |
| 4,764,711 | A | | 8/1988 | Deller | |
| 4,794,314 | A | | 12/1988 | Janu | |
| 4,879,642 | A | | 11/1989 | Malka | |
| 4,955,011 | A | * | 9/1990 | Baba | 369/53.25 |
| 4,965,501 | A | | 10/1990 | Hashimoto | |
| 5,161,083 | A | | 11/1992 | Mohler | |
| 5,229,817 | A | * | 7/1993 | Lange et al. | 399/34 |
| 5,264,781 | A | | 11/1993 | Miller | |
| 5,416,397 | A | | 5/1995 | Mazzara et al. | |
| 5,488,278 | A | | 1/1996 | McGraw et al. | |
| 5,563,483 | A | | 10/1996 | Kowall | |
| 5,585,702 | A | | 12/1996 | Jackson et al. | |
| 5,589,749 | A | | 12/1996 | Davidson | |
| 5,615,437 | A | | 4/1997 | Takahashi et al. | |
| 5,663,622 | A | | 9/1997 | Sekiguchi | |
| 5,729,067 | A | | 3/1998 | Janutka | |
| 5,744,925 | A | | 4/1998 | Madsen | |
| 5,771,393 | A | | 6/1998 | Asghar | |
| 5,854,545 | A | | 12/1998 | Eibel | |
| 5,914,849 | A | | 6/1999 | Perreira | |
| 5,929,399 | A | | 7/1999 | Jamieson et al. | |
| 5,965,960 | A | | 10/1999 | Cowan | |
| 6,227,957 | B1 | | 5/2001 | Legatt et al. | |
| 6,450,867 | B1 | | 9/2002 | Legatt | |
| 6,825,625 | B1 | * | 11/2004 | Karwath et al. | 318/434 |

* cited by examiner

LINEAR ACTUATOR CONTROL STRUCTURE

Matter enclosed in heavy brackets [ ] appears in the original patent but forms no part of this reissue specification; matter printed in italics indicates the additions made by reissue.

RELATED APPLICATION

This application claims the benefit of priority, pursuant to 35 U.S.C. §119(e), from copending U.S. Provisional Patent application Ser. No. 60/202,587 filed May 9, 2000, incorporated by reference.

FIELD OF THE INVENTION

The present invention is directed to a control system for linear actuator devices, and more particularly to a control system for linear actuator devices utilized upon a floor maintenance machine.

BACKGROUND OF THE INVENTION

For purposes of convenience, the invention will be described in conjunction with a presently preferred implementation thereof embodied in an electric linear actuator. It will be understood, however, that the principles of the invention may apply equally as well to devices of analogous structure.

The design of automatic floor cleaning equipment often involves a considerable amount of rotary and/or linear motion actuation and control. Positioning of structures such as cleaning heads and squeegees must be accomplished quickly and transparently to the operator. The traditional method of controlling motion on cleaning equipment utilizes limit switches or other proximity switches that either directly control the power to one or more linear actuators, e.g., via relay switches, etc., or indirectly control linear actuators via a signal sent to a CPU indicating the position of the actuators. These switches introduce negative reliability and assembly issues into the design of the machine. For example, an actuator or linkage could be damaged if a jam occurs in mid stroke of the actuator as current would continue to be supplied to the actuator. Additionally, limit switches may become contaminated or damaged through the operation of the machine. The switches may also be misaligned during the assembly of the machine. Any of these situations can cause the actuator to stall, overheat, and/or damage the linkage or associated structure coupled thereto.

In mobile equipment systems that include a plurality of electric and or hydraulic devices, such as servo actuators, motors and pumps, it is conventional practice to couple all of such devices to a remote master controller for coordinating or orchestrating device operation to perform a desired task. Motors and actuators may be employed, for example, at several coordinated stages of a surface cleaning machine for automated control of fluids and surface working devices. In accordance with conventional practice, the master controller may comprise a programmable controller or the like coupled to the various remotely-positioned devices. Feedback from the remote devices may be provided via control signals therefrom. For closed-loop operation, a sensor may be coupled to each device for sensing operation thereof, and feeding a corresponding signal to the master controller through an analog-to-digital converter, etc.

Thus, in a system that embodies a plurality of electric and/or hydraulic devices, a substantial quantity of electrical conductors must be provided for feeding individual control signals to the various devices and returning sensor signals to the master controller. Such conductors interfere with system design and operation, and are subject to failure. The bank of D/A and A/D converters for feeding signals to and from the master controller add to the expense and complexity of the overall system. Perhaps most importantly, system performance is limited by capabilities of the master controller. For example, a programmable controller may require one hundred milliseconds to scan a device sensor signal, compute a new control signal and transmit such control signal to the remote device. An overburdened programmable controller may not perform acceptably in high performance applications that may require a ten millisecond response time, for example, at each of a plurality of remote devices.

SUMMARY OF THE PRESENT INVENTION

The present invention relates to a linear actuator control system exhibiting improved performance. To solve some of these limitations associated with the prior art devices, a control system has been implemented in which the speed and force from the actuator can be independently controlled from a control processing unit (CPU). In a system according to the present invention, the CPU can monitor the force being delivered to the actuator and that information can be used to deduce the force and/or position of the actuator. This information can also be used to determine that the actuator has reached the end of its stroke. A system according to the present invention has the ability to reduce or terminate the power being delivered to the load device in order to prevent damage to the device. The reaction time of this protection circuitry is short enough to prevent damage to the load and the energy control circuitry. Importantly, such a system can eliminate the position sensing devices normally used in this type of machine.

The present invention relates to a control system for one or more linear actuator devices, such as present on a surface maintenance machine. One aspect of the invention is to provide a linear actuator control system for use on a surface maintenance machine, such as a scrubber or sweeper, which utilizes a comparison circuit in which a signal representative of the load current in an linear actuator is modified by a signal representative of the desired load current to maintain applied load current at a desired level.

Another aspect of the present invention provides a control system which automatically limits the current load to a linear actuator in the event of an abnormal condition, e.g. linkage jamming, obstruction contact, etc.

Another aspect of the present invention provides a control system for automatically controlling one or more linear actuators of a surface maintenance machine which may be applied to various types of surface maintenance machines having different surface maintenance tools and providing for different surface maintenance functions.

A linear actuator control system in accordance with a further aspect of the invention includes a linear actuator having an electric motor component. The electric motor component is connected to drive circuitry that includes a solid state switch, preferably a FET, that is connected between one terminal of the electric motor, with the other terminal being connected to electrical ground. The control switch circuit receives a switch control signal from the microprocessor-based control electronics, and is connected to the control electrode (gate) of the FET for setting the switch circuit and controlling power to the electric motor of the linear actuator through the FET in response to the control signal. Feedback circuitry is responsive to the current through the electric motor for resetting the switch circuit and interrupting application of power to the electric motor. The feedback circuitry is responsive to a voltage drop across a shunt resistor.

It is therefore a general object of the present invention to provide a linear actuator control system that exhibits a fast response time necessary for high performance applications, while at the same time reducing cost and complexity that are inherent in prior art system of the character described above. In furtherance of the foregoing, a more specific object of the invention is to provide a system of the described character wherein each of the system linear actuators embodies microprocessor-based control adapted to communicate with a central or master controller and for thereby distributing, at least partial, control of the several linear actuators while maintaining overall coordination thereamong.

Another object of the present invention is to provide a linear actuator control structure in which all control components, including current level detectors and microprocessor-based control electronics, are fully integrated into compact inexpensive packages, and which may be readily employed in a wide variety of system applications.

Yet another object of the invention is to provide a linear actuator of the described character with enhanced robustness of hardware, including the elimination of limit switches or other position detection devices within or in association with the linear actuator.

Still another object of the present invention is to provide a system for controlling a linear actuator device, with control electronics that limit current overload as compared with prior art devices of a similar character, and that have enhanced capabilities for protecting the linear actuator against damage due to structure obstruction, contact, etc.

BRIEF DESCRIPTION OF THE DRAWINGS

Preferred embodiments of the invention will be described in detail hereinafter with reference to the accompanying drawings, in which like reference numerals refer to like elements throughout, wherein.

DESCRIPTION OF PREFERRED EMBODIMENTS

For purposes of convenience, the invention will be described in conjunction with a presently preferred implementation thereof embodied in an electric linear actuator. It will be understood, however, that the principles of the invention may apply equally as well to devices of analogous structure.

Figure 1:
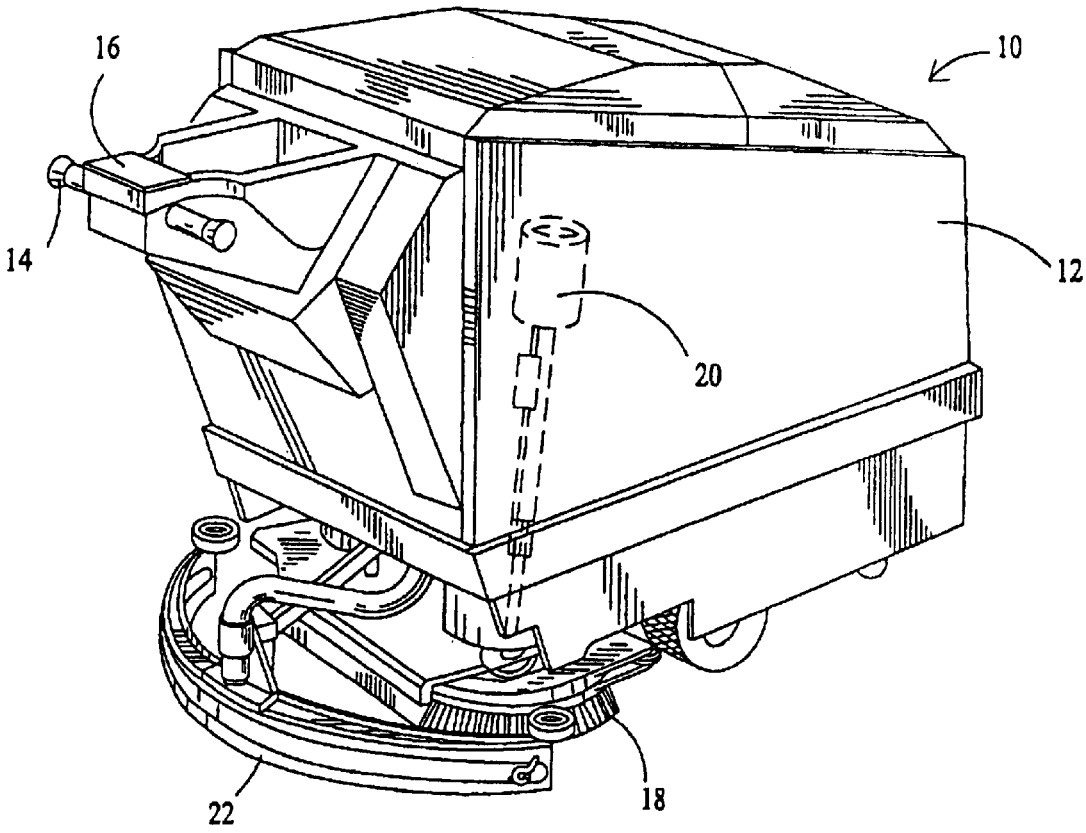
FIG. 1 is a perspective of a typical walk-behind surface maintenance machine which may utilize the control system of the present invention.

In FIG. 1, a vehicle such as a floor scrubbing machine 10 is indicated generally and may be of a type manufactured by Tennant Company of Minneapolis, Minn., assignee of the present invention. Such a device is disclosed in U.S. Pat. No. 4,757,566, the entire disclosure of which is incorporated by reference herein for all purposes. The scrubber 10 may include a housing 12 and a rear operating control 14 which is used by the operator to control vehicle 10 speed and direction. A control device 16 is used to control functions of the machine 10. There may be a pair of rotating brushes or pads 18. A linear actuator 20 may be utilized to control the position, and hence the downward force, of the brushes 18. A squeegee 22 is normally positioned at the rear of the vehicle 10 and is effective, as is known in the art, to squeegee the floor and remove any standing water. Normally, there will be a vacuum device 24 attached to the squeegee 22 which will apply suction to remove standing water collected by the squeegee.

In one embodiment of the present invention, there may be one or more surface working tools such as sweeping brushes, scrubbing brushes or polishing pads, and there may be one or more electric actuators 20 controlling the position of said surface maintenance tools 18. In other embodiments of the present invention, there may be one or more hopper or debris containers (not shown), and there may be one or more linear actuators 20 controlling the lifting of the hopper during a hopper dumping procedure. Linear actuators 20 may comprise an electric DC motor as the motive element. Those versed in the art are aware that in an electric DC motor the current which the motor draws is proportional to the load on the motor.

Although the invention will be described in connection with a scrubber 10, it should be clear that the control structure according to the present invention has application to other types of vehicles using surface maintenance tools, such as a sweeper or a polishing or burnishing machine.

Figure 2:
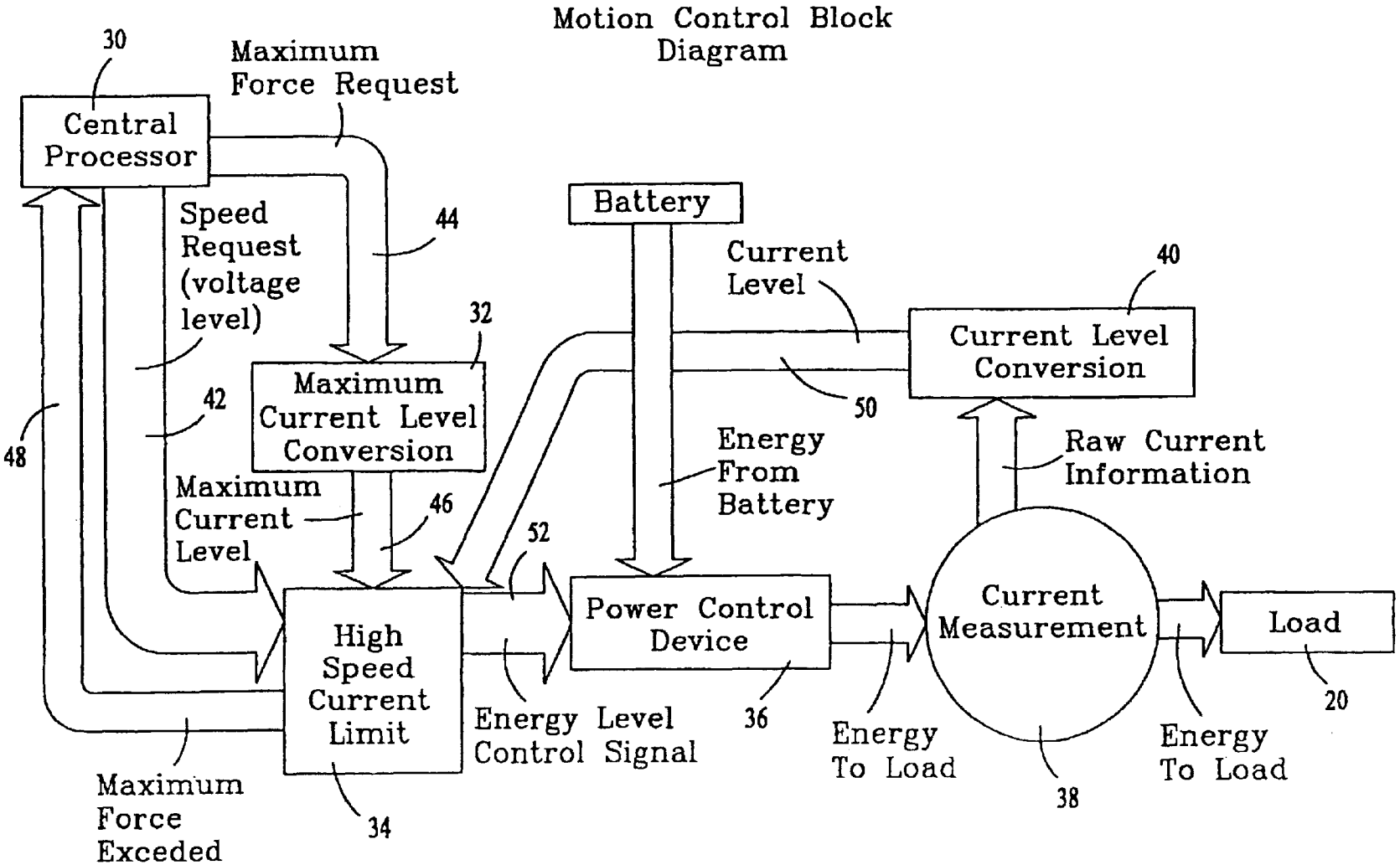
FIG. 2 is a block diagram illustrating the control system for a linear actuator according to the present invention.

Referring to FIG. 2, a block diagram is provided to explain functional interrelations between various elements of a control device 16 according to the present invention. The control device 16 is utilized to control the linear actuator 20. Control device 16 includes a central processor unit 30 (CPU) which receives input from elements of the control system and provides output signals to elements of the control system. Control device 16 includes the additional elements: maximum current level converter 32, high speed current limit 34, power control device 36, current measurement element 38, current level converter 40. Additional elements or components would be appreciated by those skilled in the relevant arts.

CPU 30 may be a dedicated controller or may be part of a larger controller for operating additional functions of a maintenance machine. CPU 30 may be a programmable logic controller (PLC). CPU 30 provides a speed request signal 42 to the high speed limit block 34. The speed request signal 42 may be an analog or digital signal. In one embodiment, the speed request signal 42 is an analog signal comprising a voltage level representative of the speed request. CPU 30 also provides a maximum force request signal 44 which is converted by the maximum current level converter 32, which may be D/A converter, into a maximum current level signal 46. Maximum current level signal 46 is provided as another input signal to the high speed current limit block 34.

CPU 10 receives a signal 48 from the high speed current limit block 34 indicating whether or not a maximum designated current of the linear actuator 20 has been exceeded. The CPU 10 utilizes this information to determine if the actuator 20 has reached the end of its stroke, or if it has come in contact with an obstacle. The CPU 10 can utilize internal timers to estimate the position of the actuator 20 during a move. It can use this information to adjust the speed and maximum force of the actuator 20 as the actuator movement progresses. For instance, the CPU 10 may request high speed and high current to start the actuator moving, high speed and medium current through the bulk of the movement, and low speed, low current to minimize the impact at the end of actuator stroke. The feedback signal 48 could be a current level, rather then the maximum force signal. In that case, the CPU 10 could also use the load information to make decisions as to actuator 20 speed, position, or stroke length. For example, this would be useful if a hopper lift height of a particular machine should be limited by load. This could also be used to estimate the speed and position of the actuator 20 using back EMF calculations or changes in mechanical advantage as the actuator 20 progresses through its stroke.

The maximum current level conversion block 32 converts the force request 44 from the CPU 10 to a maximum current level 46 that can be interpreted by the high speed current limit block 34. The high speed current limit block 34 uses the maximum current level signal 46 from the maximum current level conversion block 32, the speed request signal 42 from the CPU block 10, and a current level signal 50 from the current level conversion block 40 to generate an energy level control signal 52 for the power control device 36. In one embodiment, the energy level control signal 52 is a pulse width-modulated signal used to control the gate of a Field Effect Transistor (FET) within the power control device 36.

The output of the high speed current limit block 34 will reflect the duty cycle of the speed request 42 unless the maximum current level is exceeded (current limit mode). When in current limit mode, block 34 will signal the power control device 36 to limit the current of the linear actuator 20 in order to prevent overheating of the device or other damage. Also when in current limited mode, the high speed current limit block 34 will send a maximum force exceeded signal 48 to the CPU 10 indicating that the maximum allowable current has been exceeded. The CPU 10 can then utilize this information to terminate operation of the load. Because the high-speed current limit 34 acts prior to CPU 10 direction to reduce the current to the load 20, the time delay induced waiting for the CPU 10 to directly terminate operation of the load 20 is less critical.

The power control device 36 receives the control signal 52 from the high speed current limit block 34, and uses it to control power flow from a battery 54 to the load. In one embodiment, the power control device 36 is a Field Effect Transistor (FET). The current measurement block 40 provides a voltage level 50 proportional to the level of current flowing to the load. In this design, the current measurement device 38 is a shunt resistor. The current level conversion block 40 receives the raw current level information from the current measurement block 38, and transforms it into a format that can be received by the high speed current limit block 34.

Figure 3:
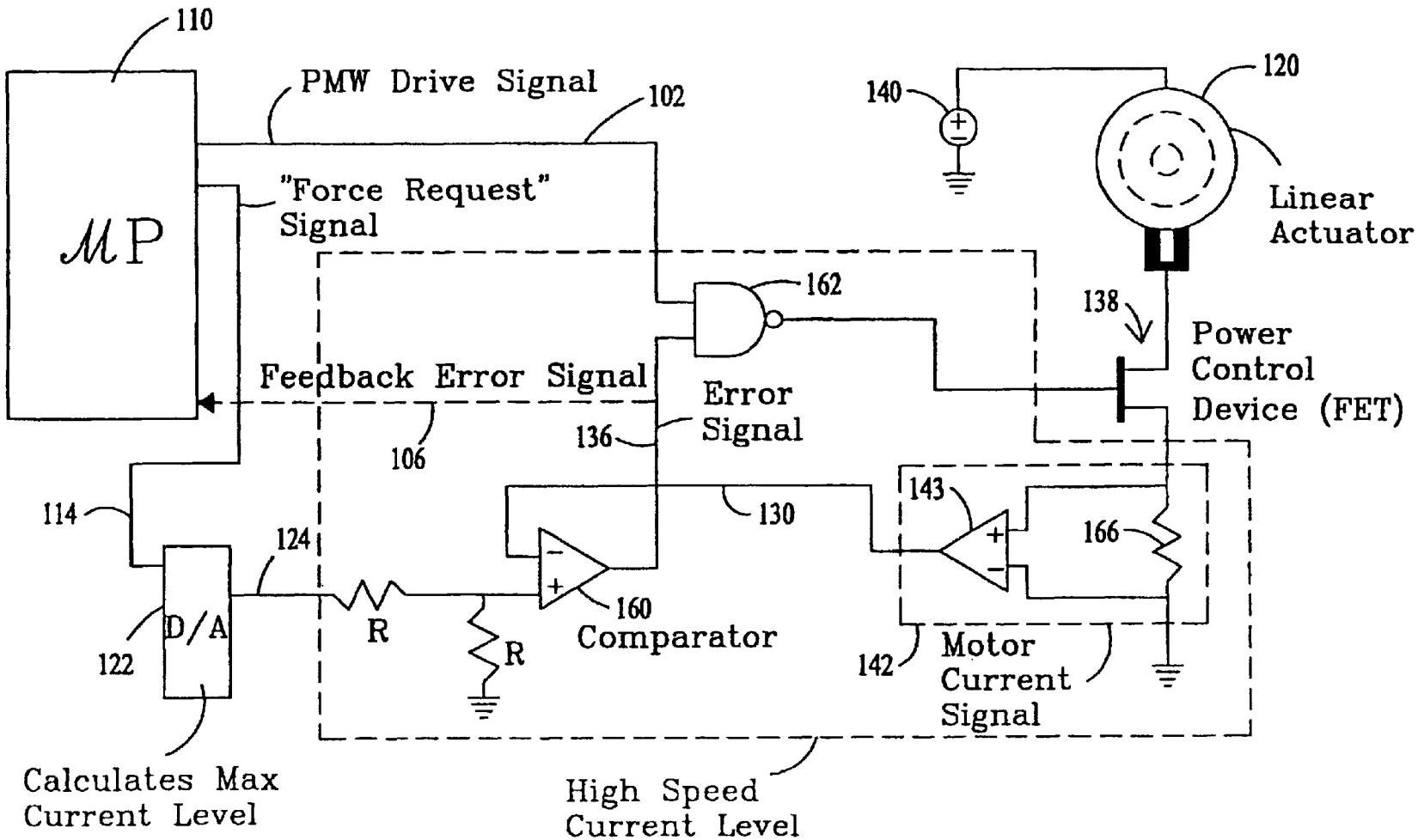
FIG. 3 is a simplified schematic circuit illustrating a preferred embodiment of the present invention.
Figure 4A:
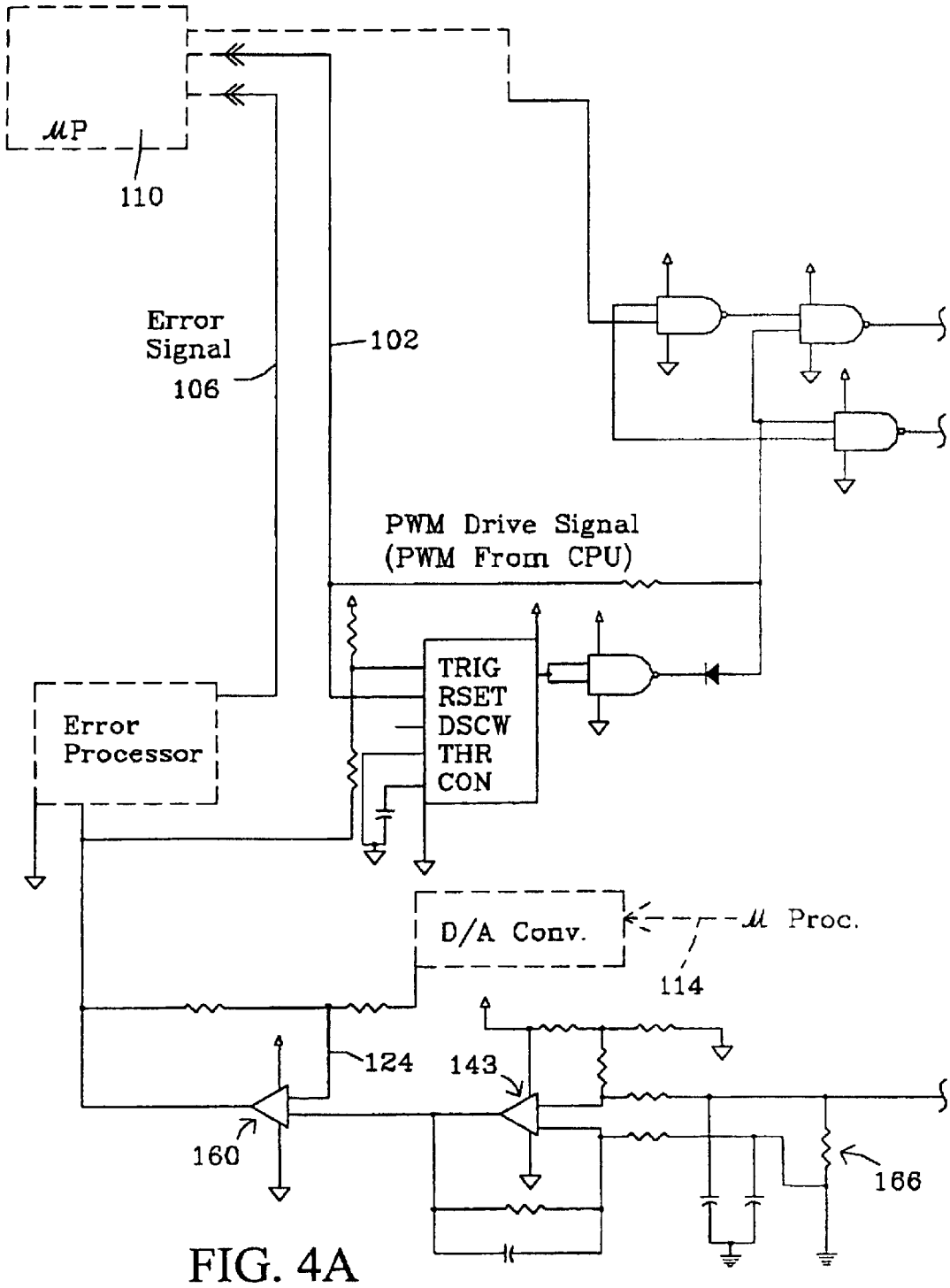
FIGS. 4A and 4B together illustrate a preferred embodiment of the control system of FIG. 1.
Figure 4B:
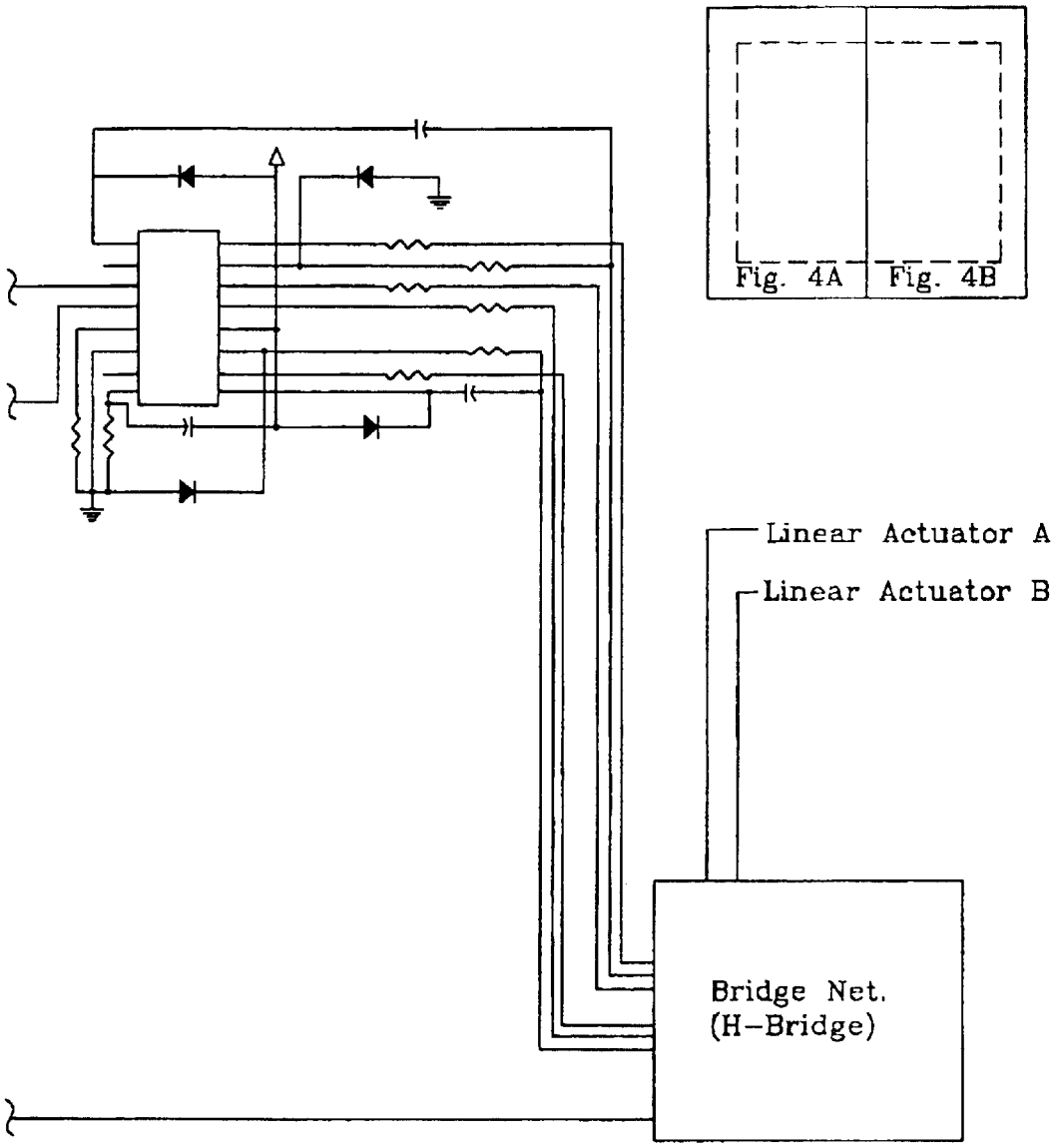

FIGS. 3 and 4 illustrate preferred embodiments of the present invention. A microprocessor controller (or CPU) 110 is utilized in the control structure. Those skilled in the relevant arts will recognize that the controller 110 can receive a variety of inputs and control a variety of outputs. Specific to illustrated embodiment of the present invention, the outputs of the controller 110 include a PWM (pulse-width-modulated) drive signal 112 and a "force request" signal 114. An input to the microprocessor 110 includes a comparison signal 106.

The force-request signal 114 is received by a D/A converter 122 which calculates a maximum current level corresponding to the force request signal 114 and outputs an analog signal representing the maximum current level 124 to a threshold comparator 160. The output input 130 to the comparator 160 is received from a motor current signal circuit 142, as described hereinafter. The comparator output 136 is provided both to a NAND device 162 and as a comparison signal 106 to the microprocessor 110 (as a feedback signal). The PWM drive signal 102 and comparator output 136 are received as input signals into the NAND device 162, the output of which is used to control the power control device (FET) 138. The linear actuator power control switch 138 is a FET having primary current-conducting source and drain electrodes connected in series with the linear actuator 120 and a current sensing shunt resistor 166 between ground. The motor current signal 130 (to the comparator) 160 is obtained via a motor current signal circuit 142 vis-a-vis an amplified shunt resistor voltage. The output 130 from an amplifier 143 is a voltage indicative of load current in the linear actuator 120. The motor current sensor 142 utilizes a shunt resistor 166, with the voltage drop across the shunt 166 used as an indicator of the current flow to the motor 120. Alternative current sensors 142 maybe used, however. For example, a toroidal core or other non-contact type of sensor may be utilized.

In operation, the microprocessor 110 generates a PWM drive signal 102 and a force request signal 104. In underload current conditions (the comparison signal 106 not high), the PWM signal 102 is passed through the NAND device 162 to the FET switch 138 to control the duty cycle of the linear actuator 120. Conversely, when under excessive current load condition (the comparison signal 106 is high), the NAND device 162 blocks the PWM signal 102 from activating the FET switch 138.

After the PWM drive signal 102 is generated, the force request signal 114 is generated and passed from further processing by the D/A converter 122. The threshold comparator 160 is used to detect over current conditions (the motor current signal 130 exceeds the D/A output signal) 124. A comparison signal 136 is generated and fed back to the microprocessor 110.

FIG. 3 includes additional aspects of the present invention, include a multiplexer and the FET-based bridge for implementing the control system for a pair of linear actuators.

Various modifications of the above-described embodiment of the invention will be apparent to those skilled in the relevant arts, and it is to be understood that such modifications can be made without departing from the scope of the invention.

What is claimed is:

1. A control system for a linear actuator having an associated current level, said control system comprising:

a current control component for controlling a current flow to the linear actuator, said current control component responsive to an input control signal;

a current sensing component for determining an operation current level of the linear actuator and generating a current signal as a function of the operational current level of the linear actuator;

a control device for generating a drive signal and a force request signal;

a load signal generating device responsive to the force request signal and the current signal; and a control device for controlling the current control component, said control device accepting a load signal and the drive signal and generating the input control signal to control the current control component.

2. A control system for a linear actuator according to claim 1, wherein the current control component is a switch device for operatively coupling the linear actuator to a circuit ground.

3. A control system for a linear actuator according to claim 2, wherein the switch device includes a FET switch.

4. A control system for a linear actuator according to claim 1, wherein the linear actuator current signal detection component includes a shunt resistor structure.

5. A control system for a linear actuator according to claim 1, wherein the force request signal is a digital signal.

6. A control system for a linear actuator according to claim 1, wherein the force request signal operation component includes a digital-to-analog converter.

7. A control system for a linear actuator according to claim 1, wherein the load signal generating device is a comparator for comparing the force request signal and the current signal.

8. A linear actuator control system comprising:

a linear actuator having a predetermined current level;

a current level detection device operatively coupled to the linear actuator and generating a current level signal;

a digital control device generating a first control signal and a second control signal, said digital control device receiving a feedback signal;

a comparator device for receiving the first control signal and the current level signal, said comparator device generating a comparison signal; and a control device accepting the comparison signal and the second control signal and controlling the current level of the linear actuator.

9. A linear actuator control system according to claim 8, wherein the control device includes a FET switch.

10. A linear actuator control system according to claim 8, wherein the control device includes a NAND logic device.

11. A linear actuator control system according to claim 8, wherein the current level detection device includes a shunt resistor structure.

12. A linear actuator control system according to claim 8, wherein the first and second control signals are digital signals.

13. A linear actuator control system according to claim 8, first control signal is processed by a D/A converter prior to being introduced to the comparator device.

14. A control system for a linear actuator device comprising:

a linear actuator including an electric motor having a current level;

an electronic controller generating a pair of signals, each signal representative of a desired delivery of current to the linear actuator;

a motor current sensing device for determining the current level of the linear actuator electric motor; said device generating a current signal;

a comparator for comparing the current signal to one of the pair of signals, said comparator generating a comparator signal upon the current signal exceeding a current level associated with the one of the pair of signals;

a logic device receiving the comparator signal and the other of the pair of signals, said logic device controlling the flow of current to the electric motor of the actuator.

15. A control system according to claim 14, wherein the logic device is a NAND device and wherein an output of the NAND device is coupled to a current switch.

16. A control system according to claim 15, wherein the current switch is a FET switch.

17. A control system according to claim 14, wherein the electronic controller operates at a predetermined system speed, and wherein the pair of signals are generated and held through a predetermined time interval dependent upon the system speed.

18. A control system of claim 17, wherein the motor current sensing device, the first comparator, and the logic device function to control a current flow to the electric motor within a time interval which is substantially smaller than the predetermined time interval of the electronic controller.

19. A control system for a linear actuator comprising:

a linear actuator having an electric motor, said electric motor drawing a variable current level during operation;

a current level sensor for determining an operational current level of the linear actuator;

a controller for generating a drive signal, said drive signal remaining constant during a predetermined time interval, said controller further generating a force request signal representative of a desired current level of the linear actuator; and a current limiting component for receiving the force request signal, the current level of the linear actuator and the drive signal, said current limiting component minimizing the current level of the electric motor in response to a comparison between the force request signal and the desired current level, said current limiting component minimizing the current level within a time interval substantially smaller than the predetermined time interval.

20. A control system according to claim 19, wherein the current limiting component includes a comparator and a logic device.

21. A control system according to claim 20, wherein the drive signal includes a digital signal and the force signal includes an analog signal.

*22. A control system for an electric actuator comprising:*

*a electric actuator having an electric motor, said electric motor drawing a variable current level during operation;*

*a current level sensor for measuring an operational current level of the electric actuator;*

*a electronic controller for generating a force request signal representative of a desired current level of the electric actuator; and*

*a current limiting component for receiving the force request signal and the current level of the electric actuator, said current limiting component minimizing the current level of the electric motor in response to a comparison between the force request signal and the current level of the electric actuator.*

*23. The control system of claim 22, wherein the current level sensor includes a shunt resistor structure.*

*24. The control system of claim 22, wherein the force request signal includes at least a high current signal and a low current signal.*

*25. The control system of claim 22, wherein the current limiting component includes a comparator receiving the force request signal and the current level of the electric actuator.*

*26. The control system of claim 22, wherein the current limiting component includes a FET switch.*

*27. A control system for an electric actuator device comprising:*

*a electric actuator including an electric motor having a current level;*

*a electronic controller generating a signal representative of a desired delivery of current to the electric actuator;*

*a motor current sensing device for measuring the current level of the electric actuator and generating a current signal;*

*a comparator for comparing the current signal to the signal representative of the desired delivery of current to the electric actuator, said comparator generating a comparator signal upon the current signal exceeding a current level associated with the signal representative of the desired delivery of current to the electric motor; and*

*a logic device receiving the comparator signal, said logic device controlling the flow of current to the electric motor of the actuator.*

*28. The control system of claim 27, wherein the logic device includes a NAND device.*

*29. An electric actuator control system for a surface maintenance machine comprising:*

*a electric actuator drawing a variable current level during operation, said actuator moving a portion of the surface maintenance machine toward contact with a floor surface;*

*a current level detection component operatively coupled to the electric actuator and generating a current level signal;*

*a digital control component generating a first control signal;*

*a comparator device for receiving the first control signal and the current level signal, said comparator device generating a comparison signal; and*

*a control component utilizing the comparison signal to control the current level of the linear actuator, said control component limiting a force applied to the floor surface by said portion while said surface maintenance machine is powered across the floor surface.*

*30. The control system of claim 29, wherein the control component includes a FET switch.*

*31. A method of controlling an electric actuator of a surface maintenance machine comprising:*

*providing a linear actuator on a surface maintenance machine, said linear actuator drawing a variable current level during operation, and said linear actuator being coupled to a portion of the surface maintenance machine, said portion adapted to move toward contact with a floor surface in response to activation of said linear actuator;*

*measuring a current level of the linear actuator during operation;*

*generating a current level signal;*

*generating a first control signal;*

*comparing the first control signal and the current level signal;*

*generating a comparison signal based on the step of comparing; and*

*controlling the current level of the electric actuator based on the comparison signal, said controlling tending to limit a down force applied by said portion against the floor surface while said surface maintenance machine is powered across the floor surface.*

* * * * *